United States Patent [19]
Lönne

[11] 3,948,371
[45] Apr. 6, 1976

[54] SELF CENTERING CLUTCH RELEASE BEARING

[75] Inventor: Klaus Lönne, Opladen, Germany

[73] Assignee: SKF Industrial Trading and Development Company, B.V., Amsterdam, Netherlands

[22] Filed: Dec. 5, 1973

[21] Appl. No.: 422,073

[30] Foreign Application Priority Data
Dec. 9, 1972  Germany............................ 7245141

[52] U.S. Cl. .................................................. 192/98
[51] Int. Cl.² ........................................ F16D 23/14
[58] Field of Search ........................... 192/98, 110 B

[56] References Cited
UNITED STATES PATENTS

| | | | |
|---|---|---|---|
| 3,333,664 | 8/1967 | Chapaitis | 192/98 |
| 3,631,954 | 1/1972 | Coaley | 192/98 |
| 3,741,361 | 6/1973 | Brandenstein | 192/98 X |
| 3,788,437 | 1/1974 | Camp | 192/98 |

FOREIGN PATENTS OR APPLICATIONS

| | | | |
|---|---|---|---|
| 1,240,463 | 7/1971 | United Kingdom | 192/98 |
| 474,112 | 10/1937 | United Kingdom | 192/110 |
| 531,046 | 12/1940 | United Kingdom | 192/98 |

*Primary Examiner*—Benjamin W. Wyche

[57] ABSTRACT

A self centering clutch release bearing assembly having a central axis of rotation includes a supporting member, a first non-rotatable race adapted to be engaged by the clutch shift mechanism and a second rotatable race between which are located a plurality of anti-friction bodies. The first race is mounted on the supporting member to be resiliently movable about a pivot point at an angle thereto. The second race has a spherical surface adapted to engage the clutch release levers. The means for mounting the first race is arranged so that the forces acting upon it lie in a plane intersecting the axis of the bearing at a point, the point forming the pivot of angular movement of the first race and coinciding with the radial center of the spherical surface of the second race.

7 Claims, 3 Drawing Figures

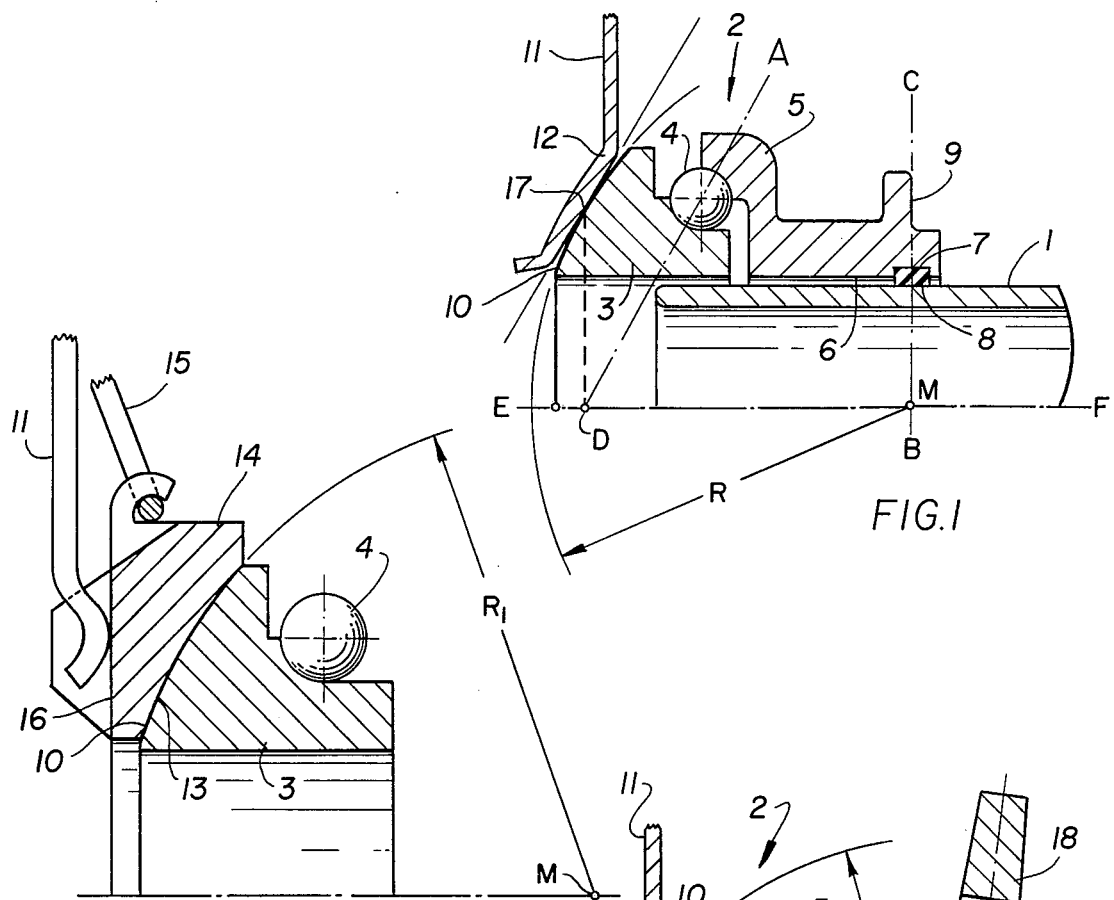
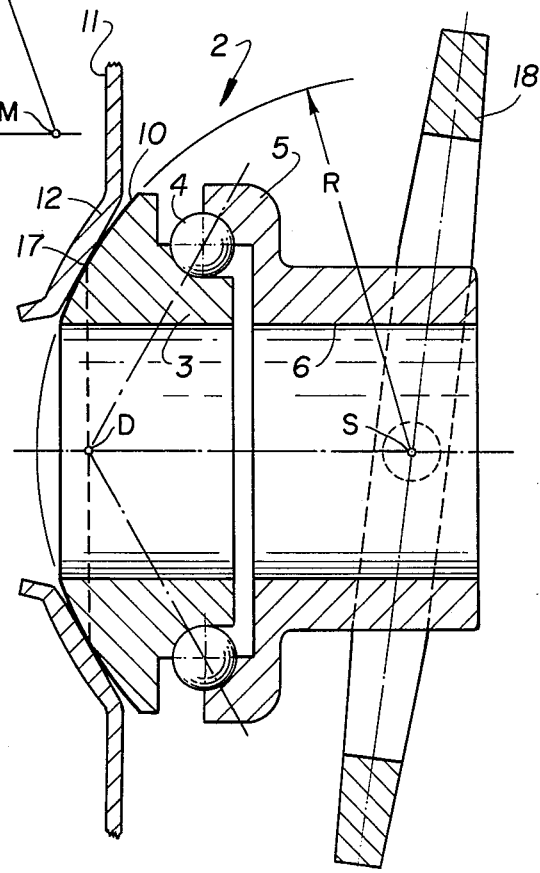
FIG.1
FIG.2
FIG.3

SELF CENTERING CLUTCH RELEASE BEARING

BACKGROUND OF THE INVENTION

The present invention relates to self centering clutch release bearings.

In the German Pat. disclosure DOS No. 1,929,184 a clutch release bearing assembly, particularly adapted for use with motor vehicles is shown comprising a guide part (shaft) secured to a clutch or gear housing and a movable part (release bearing) arranged to be axially movable on the fixed guide part between the clutch shift mechanism and the clutch release lever. In the form of the assembly according to the aforementioned patent, the bore of the moving part (bearing) is made larger in diameter than the fixed part (shaft) and is mounted through the employment of resilient means interposed between the bore and a slidable sleeve arranged about the fixed part. In the aforementioned patent, it has also been discussed that the conventional sliding sleeve can be dispensed with entirely and that the resilient means be interposed in a groove formed in the bore of the inner race of the bearing and the supporting shaft.

A disadvantage of the construction described in the aforementioned patent lay in the fact that the rotating race of the bearing was susceptible to axial offset on relative movement of the clutch release lever and its associated parts. In addition, forces or moments imposed on the slidable member were transmitted to the bearing directly.

It is the object of the present invention to provide a clutch release bearing in which the self centering is more easily, simply and more effectively accomplished.

It is a further object of the present invention to provide a self centering clutch release bearing in which axial offset is entirely avoided and that no additional forces or moments are transmitted to the bearing.

The foregoing objects, as well as others, together with numerous advantages will be apparent from the followin disclosure of the preferred form of the present invention.

SUMMARY OF THE INVENTION

According to the present invention a self centering release bearing assembly is provided having a central axis of rotation. The assembly comprises a supporting member, a first non-rotatable race adapted to be engaged by the shift mechanism, a second rotatable race adapted to engage the clutch release lever, and a plurality of anti-friction bodies located therebetween. The first non-rotatable race is mounted on the supporting member so as to be resiliently movable about a pivot point at an angle thereto. The means for mounting the first race is arranged so that the forces acting on it lie in a plane intersecting the axis of the bearing at a point which forms the pivot of angular movement and coincides with the center of the spherical surface of the second race.

With the above construction, the result is advantageously reached that the release bearing supported directly on the supporting member and that any additional forces which are the result of the sliding movements created by the shift mechanism on the stationary bearing race are not transmitted via the bearing to the clutch release lever and its associated parts. Further, axial offset of the clutch release member are further easily compensated for by the present construction.

In one form of the invention the supporting member comprises the shaft or spindle of the assembly and the non-rotating race is mounted thereon by a resilient ring, such as an O-ring which is interposed in a groove cut in the surface of the inner bore of the race between it and the shaft. The resilient ring lies in a radial plane transverse to the axis of the shaft. In another embodiment, the non-rotating race is mounted on a lever or disk at a point coinciding with the pivot point.

Advantageously, the clutch release lever is bent to provide a taper engaging the spherical surface of the race. These bent portions may also be of concave shape conforming to the spherical surface of the race.

In another form of the present invention a centering ring is interposed between the rotating race and the clutch release lever and is supported on the clutch release lever by a resilient spring means.

Full details of the present invention are given in the following description of its preferred embodiments and are shown in the accompanying drawings.

BRIEF DESCRIPTION OF THE DRAWINGS

In the drawings:

FIG. 1 is a sectional view of a clutch release bearing showing only the portion above the central axis of rotation, formed in accordance with the present invention, FIG. 2 is a view of another embodiment of the present invention, FIG. 3 is a view showing still a third embodiment of the present invention.

DESCRIPTION OF THE INVENTION

In the embodiment of FIG. 1 a shaft 1 or sliding sleeve if desired, is arranged with a clutch release bearing 2 mounted about it. The bearing 2 is an oblique ball bearing comprising a rotatable inner race 3, a plurality of anti-friction bodies such as balls 4 and an outer non-rotating race 5. The balls 4 make contact with the race surfaces along an oblique or angular line A–D with respect to the axis E–F of a drive shaft 1 journaled in conventional manner in the gear casing. The axis E–F coincides with the axis of rotation of the bearing, when it is in normal position.

The outer race 5 is provided with an axial portion or sleeve having an inner concentric bore 6 which is maintained in sliding contact with the surface of the shaft 1. An annular groove is cut within the bore 6 and an elastic ring member 8 is inserted within the groove 7 permitting the outer race to be movable angularly with respect to the shaft but not rotatable with it. The elastic ring 8 may for example be in the well known form of an O-ring seal of resilient plastic rubber or the like. A more rigid and less resilient ring may be employed.

The outer race 5 is provided with a radially outward annular flange 9 which is adapted to engage with the not shown slide actuating elements of the clutch shift mechanism which causes the race 5 to move relative to the shaft 1 and angularly with respect to the center line E–F.

The engaging surface or surfaces on which the force from the shift mechanism is applied to the flange 9 and to the O-ring 8, is located in a radial plane perpendicular to the axis E–F as defined by the line C–B. The central axis E–F traverses and intersects the radial plane C–B at a point M which is the pivot point about which the outer race moves angularly with respect to the axis. The point M is furthermore the center of the spherical surface 10, having a radius R, forming the face of the rotating race 3. A clutch release lever 11 having bent inner portions forming a clutch pressure spring 12 engages the spherical face 10 of the rotating race 3. The clutch release lever 11 is connected in known manner to the clutch release parts. The bent pressure spring ends 12 may be flat in cross-section or they may be concave to conform to the outline of the face 10.

The point of application of the force, indicated by the numeral 17, of the clutch release lever 11 on the rotating race 3 is generally normal or perpendicular to a tangent to the face 10. The projection of this point 17 along a line perpendicular to the central axis E–F crosses the central axis at an intersection D. In the event an axial offset between the rotation axis of the clutch release part and the clutch release lever 11 is created, sliding movements are produced between the rotating bearing race 3 and the clutch release lever 11 and between the race 5 and the shaft 1. These sliding movements can be reduced by increasing the distance M–D. This may be accomplished by varying the axial length of the outer race 5.

FIG. 2 shows another embodiment where the spherical surface 10 of the inner race 3 mates with a spherical surface 13 of a centering ring 14, interposed between the inner race and the clutch release lever 11. The radius of the surface 13 is denoted by the numeral $R_1$. The centering ring 14 is secured in its position by a supporting spring 15 attached to the clutch release lever. The spring pressure portion of the clutch release lever 11 is biased to press against the outer surface 16 of the centering ring 14. The centering ring and its function is well known in this art and bears no further description herein. It will be noted that the relationships disclosed in FIG. 1 carry over to the form shown in FIG. 2, the outer race and its function is the same as that of FIG. 1.

In FIG. 3 still another embodiment is shown in which the shaft or guiding sleeve, together with the resilient slide ring 7 of FIG. 1 is dispensed with all together. The clutch release bearing is supported here to provide angular movement on a lever 18. The lever 18 may be an elongated member or a ring or similar device and is journalled about an axis having a center S intersecting the axis E–F of the bearing, to the non-rotating outer race 5. The lever 18 is adapted to engage the not-shown slide actuating elements of the shift mechanism which apply their force on the lever 18 in a plane lying at an angle to the central axis E–F on which the point S lies. The point S thus forms the pivot point for the race 5 as well as the radial center of the spherical surface 10 (indicated by radius R) forming the outer face of the rotating bearing race 3. In other respects the bearing assembly shown in FIG. 3 remains the same as previously described with respect to FIG. 1.

It will be seen from each of the foregoing embodiments that the sliding actuating means is adapted to produce its force on the non-rotating race in a plane which intersects the central axis of bearing rotation at a point which forms simultaneously the center of the spherical surface of the rotating race against which the clutch release lever abuts and the pivot point for the bearing. Thus the point about which the bearing moves angularly with respect to its supporting member coincides with the center of the engaging surface for the clutch release lever. As a result the release mechanism is supported directly on the shaft or sleeve or other supporting member and that any additional forces created as a result of the sliding movement between shift mechanism and the stationary bearing race are not transmitted via the rotating race to the release lever and the clutch release lever spring plates to the released parts.

Various embodiments and modifications have been suggested, others will be apparent to those skilled in the art. It is intended therefore that the present disclosure be taken as illustrative only of the invention and not as limiting of its scope.

What is claimed is:

1. A self centering clutch release bearing assembly having a central axis, comprising a supporting member, a first non-rotatable race adapted to engage a shift mechanism, means mounting said first race on said supporting member to be resiliently movable about a pivot point at an angle thereto, a second rotatable race, and a plurality of anti-friction bodies rotated therebetween, said second race having a spherical surface adapted to engage a clutch release member, said means for mounting said first race being arranged so that the point forming the pivot of angular movement of said bearing coincides with the center of the spherical surface of said second race and lies on the axis of said bearing in a plane intersecting the axis of said bearing in which the forces acting on said first race lie.

2. The assembly according to claim 1 wherein said supporting member comprises a shaft and the means for mounting said first race comprises a resilient ring interposed between said first race and said shaft, said ring lying in a radial plane transverse to the axis of said shaft.

3. The assembly according to claim 1 including a clutch release lever having a portion engaging the spherical surface of said second race.

4. The assembly according to claim 3 wherein the portion of said release lever engaging the second race is concave conforming to the surface of said second race.

5. The assembly according to claim 1 including a centering ring interposed between the clutch release lever and said second race, said centering ring having a surface conforming to the spherical surface of said second race and resilient means for supporting said centering ring on said clutch release lever.

6. The assembly according to claim 1 wherein said supporting member comprises a lever pivotally secured to said first race about an axis intersecting the axis of the bearing at the coincident pivot and spherical center of said bearing.

7. The assembly according to claim 1 wherein said first race comprises the outer bearing race.

* * * * *